UNITED STATES PATENT OFFICE.

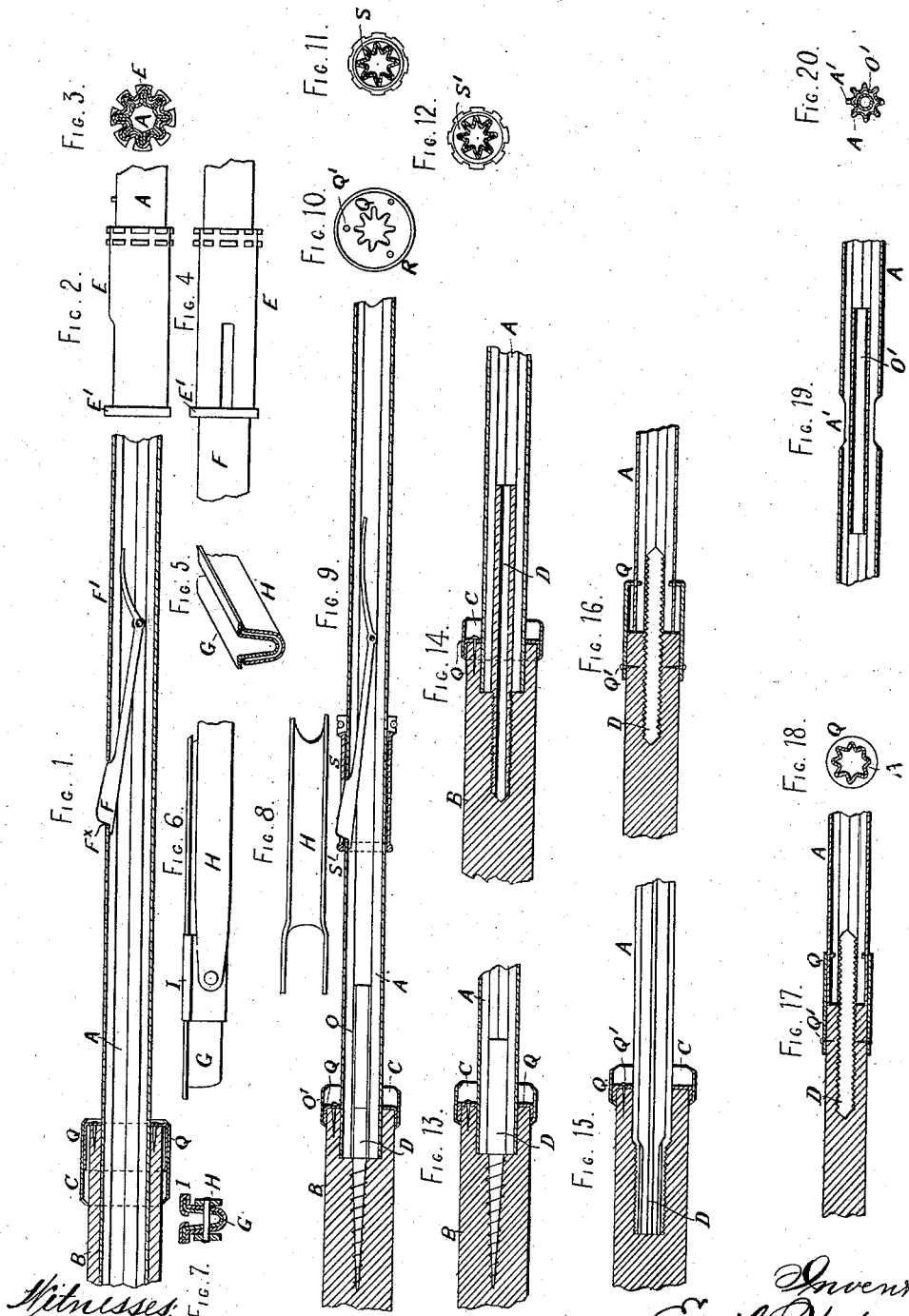

EMIL WEIDLICH, OF LONDON, ENGLAND.

HANDLE AND STICK FOR UMBRELLAS, &c.

SPECIFICATION forming part of Letters Patent No. 558,884, dated April 21, 1896.

Application filed December 20, 1890. Serial No. 375,366. (No model.) Patented in England December 19, 1888, No. 18,587, August 3, 1889, No. 12,352, and November 23, 1889, No. 18,822; in France April 17, 1889, No. 197,562, and in Belgium February 3, 1890, No. 89,370.

*To all whom it may concern:*

Be it known that I, EMIL WEIDLICH, a subject of the Queen of Great Britain, residing at London, England, have invented certain new and useful Improvements in Handles and Sticks for Umbrellas, &c., (for which I have obtained Patents in Great Britain, No. 18,587, dated December 19, 1888; No. 12,352, dated August 3, 1889, and No. 18,822, dated November 23, 1889; in France, No. 197,562, dated April 17, 1889, and in Belgium, No. 89,370, dated February 3, 1890,) of which the following is a specification, reference being had to the accompanying drawings.

This invention relates to improvements in umbrellas in which the stick is made with flutings for the ribs to arrange themselves in along with the stretchers.

The objects of this invention are to accomplish the latter object more perfectly and to improve the connection between the fluted stick and the end ferrule and between the fluted stick and the handle and generally to reduce the bulk and weight while increasing the strength and utility and improving the appearance.

Figure 1 of the accompanying drawings is a longitudinal section of part of a hollow stick broken off as to length, but showing the handle part and the lower spring-catch. Fig. 2 is a side view showing the runner and outer stop, and Fig. 3 a cross-section of stick and runner. Fig. 4 is a side view of the runner resting on the outer spring-catch. Fig. 5 is a perspective sectional view of a rib and stretcher when folded in each other; Fig. 6 a side view, and Fig. 7 a cross-section, of the rib and stretcher joint, and Fig. 8 a plan of the stretcher-joint end. Fig. 9 is a longitudinal section through handle end of a stick, showing modified form of handle-fastening and of runner. Fig. 10 is an end view of handle-fastening plate. Figs. 11 and 12 are a cross-section and an end view of the runner. Figs. 13 and 14 are longitudinal sections showing two modified forms of handle-fastening. Figs. 15, 16, and 17 are longitudinal sections, and Fig. 18 a cross-section, illustrating other forms of handle connection. Figs. 19 and 20 are a longitudinal section and a cross-section showing a mode of reducing the size of the stick at the place where the rib and stretcher joints lie in the folded-up umbrella.

The tubular stick A is made from a cylindrical tube of thin brass, aluminium-bronze, delta-metal, or other suitable material of sufficient strength and resilience, the fluted shape being imparted to it by rolling. If it is filled with a core of gutta-percha, it may be made of still thinner substance, as the core imparts additional strength and resilience. It is driven into the wooden or other handle B about one and a half or two inches.

The tip-cap C, Fig. 1, is of usual form. The cap Q has one end bent at an angle over the end of handle B, and through said bent-over portion pass securing screws or nails Q' into the handle, thus preventing the said cap from turning. Said cap is provided with an opening whose edge is fluted, whereby the edge of the opening in said cap Q will fit over and within the flutings of the stick A. The cap Q is shown in end view in Fig. 10.

The runner E, Figs. 1, 2, 3, and 4, is cut from a length of tube having the fluted shape imparted to it by rolling and fits easily but accurately on the stick A. The handle end of the runner is by preference provided with a strengthening or ornamental fluted flange E', either by pressing up the end by means of a special tool or by soldering on a thin flat ring of the exact form of the fluted exterior of the runner.

F, Figs. 1 and 4, shows the two runner-catches, consisting each of the flat cam-shaped part, which is protruded through a slot on the runner by the spring part F', the end of which, after insertion, is riveted to the stick, as shown at $F^2$. It will be observed that the slot in the runner as well as through the stick is through one of its ridges, so that the catches F do not interfere with the accurate placement of each rib and stretcher in its particular fluting of stick and runner, there being as many flutings as there are ribs G and stretchers H, eight being the usual number; but in order to be able to give the spring-catch much more than the usual tension and yet not to have the part F protrude more than shown I form it with a projection F<sup>×</sup>, which keeps it from protruding more than shown, and the tension can then and should be so great that the projection F<sup>×</sup> in the position shown presses hard against the interior of the stick at this place. The stretchers H are jointed to the runner by wiring.

Referring to Figs. 5, 6, 7, and 8, the ribs G are of a rather deep trough shape with narrow flanges, which latter are slightly curved, as shown by the dotted circle and radius in Fig. 5. By this means and by the slight rounding of the flange edges I prevent the silk or other covering from being cut or injured. The stretcher H is of a corresponding trough shape, but without flanges, the rib G folding in the stretcher H. The rib is only just deep enough to admit of a rivet to pass through for jointing the stretcher to the rib, the git I being made rather longer than usual, thus making up for the loss of strength of rib occasioned by the rivet-hole, and being also firmly and accurately lapped around the flanges of the rib, as shown at Fig. 7, by a special tool. The stretcher is made forked and splayed where it is jointed to the rib and git, as shown in Figs. 6, 7, and 8.

In Figs 9 and 10 is shown a mode of fixing the handle. The stick A has a thin tube O driven into it, and into this tube is fixed by soldering (or screwing) a screw D; or the screw D may be screwed into the stick A without a tube O being used. The protruding end of the screw D is screwed into the handle B, into which the end of the stick A is also recessed. This forms a strong union with the handle and prevents breakage in the place where it is exposed to the greatest strain. A strong joint results with minimum weight. For the purpose of preventing the handle from becoming unscrewed from the stick I use a cap or plate Q of metal, wood, or other suitable material, with a hole stamped or cut in the middle thereof corresponding to the flutings of the stick, and secured to the handle by means of pins or screws Q'. The cap may be with a perfectly flat end, as shown. It may be made of a more or less cup-like or conical section to fit on the handle, and when a tip-cap—as, for instance, C—is employed the latter may be spun over it, and will thereby be prevented from slipping off. Sometimes it may be made in the form of a plate, for use with an ivory or similar handle, and the latter may be recessed in such manner that the plate is put over, and, fitting around the stick, is forced into the recess by any suitable means, so as to do away with the necessity for pins or the like, the recess being of a square or other shape to prevent the stick from turning; but, as already stated, I prefer to attach the handle in such a manner that it can readily be taken off and exchanged for another. This does away with the necessity for the keeping so many umbrellas in stock fitted with handles, so that the customer having chosen the frame and cover which he prefers may next select the kind of handle he likes, which handle is then readily put on. He may also at any time—say when having the umbrella recovered—have a new handle fitted according to his fancy. Umbrellas thus made take up less room in length when the handle is detached.

In Fig. 13 is shown another mode of attaching the handle. The tube O is in this case omitted and the screw D is fixed in the stick A directly—say by soldering or, by preference, by screwing.

Fig. 14 shows another form in which the screw D is tubular.

In Fig. 15 the screw D and tube O are dispensed with, the end of the stick A being turned down, solder run into the fissures produced, and a screw-thread D then formed thereon.

Fig. 16 shows yet another form which is suitable for a handle of but little larger thickness than the stick. The screw D is fixed in the stick A, as before, either directly or by the intervention of a tube O, and either screwed in or soldered in the stick; but instead of the stick being recessed into the handle the two are united by a cap Q, which at one end is cut out to fit the corrugations of the stick A and is fixed to the handle by one or more pins or screws Q'. Figs. 17 and 18 show a similar mode of attachment for the case of a stick of the same diameter as the handle.

In order to make the ribs and stretchers fit closer to the stick, I reduce the diameter of the stick at that part where the gits are when the umbrella is folded up, as shown at A' in the sectional views, Figs. 19 and 20, and I strengthen the stick by inserting in any suitable manner a solid or tubular rod O' at that part. The stick may, as shown in Fig. 20, be partly reduced—that is to say, have only every other rib reduced, the rest of the ribs being untouched—and in this way I afford sufficient space for the rib and stretcher joints. The parts cut through by the reduction should be united with each other and united with the tube O' by soldering. Instead of reducing four of the ribs I may reduce six, leaving only two opposite ribs as guide for the runner.

The runner S, Figs. 9 and 11, is made somewhat like those in common use—that is to say, cylindrical inside and out—with the exception that it is provided with flutings at S', extending only a small part of its length—say one-sixteenth or one-eighth of an inch—to fit the stick, or, as shown at Fig. 12, it may have only one or more inward projections, which enter the flutings of the stick. The inward projection or projections S' may, as preferred, be at one end, as shown in Fig. 9, or in any other part. The form of runner described is also applicable to umbrella-sticks having a larger or smaller number of flutings than here shown. It insures minimum weight, neat appearance, sufficient guidance on the stick, and slight working friction.

Having fully described my invention, what

I desire to claim and secure by Letters Patent is—

1. In combination with an umbrella-stick having vertical flutings or corrugations as described, the handle B, the ring or cap Q having projections which enter the flutings, and the screws Q' which unite the ring and the handle, substantially as and for the purpose set forth.

2. In combination with an umbrella-stick having vertical flutings or corrugations, the handle B, receiving the end of the stick, a screw D screwed into the stick and having its protruding end screwed into the handle, and a cap Q having projections which enter the flutings of the stick, said cap being secured to the handle, as and for the purpose specified.

3. In combination with an umbrella-stick having flutings as described, the ribs and stretchers, said stick being reduced in diameter as at A', and a rod O' inserted in the stick at a point corresponding to the reduced portion of the stick.

EMIL WEIDLICH.

Witnesses:
DAVID McGAW,
JOSEPH LAKE.